(12) United States Patent
Dubey et al.

(10) Patent No.: US 12,555,592 B2
(45) Date of Patent: Feb. 17, 2026

(54) EMBEDDED ENABLEMENT FOR OPTIMAL GAIN-MASK MACHINE LEARNING, AUDIO CHANNEL-BASED SIGNAL ENHANCEMENT

(71) Applicant: Cypress Semiconductor Corporation, San Jose, CA (US)

(72) Inventors: Anand Dubey, Munich (DE); Monisankha Pal, Irvine, CA (US); Ted Wada, Irvine, CA (US); Arvind Ramanathan, Dublin, CA (US); Ashutosh Pandey, Irvine, CA (US)

(73) Assignee: Infineon Technologies Americas Corp., San Jose, CA (US)

( * ) Notice: Subject to any disclaimer, the term of this patent is extended or adjusted under 35 U.S.C. 154(b) by 173 days.

(21) Appl. No.: 18/506,434

(22) Filed: Nov. 10, 2023

(65) Prior Publication Data

US 2025/0157480 A1 May 15, 2025

(51) Int. Cl.
*G10L 21/0232* (2013.01)
*G10L 25/18* (2013.01)
*G10L 25/30* (2013.01)
*G10L 21/0208* (2013.01)

(52) U.S. Cl.
CPC .......... *G10L 21/0232* (2013.01); *G10L 25/18* (2013.01); *G10L 25/30* (2013.01); *G10L 2021/02082* (2013.01)

(58) Field of Classification Search
None
See application file for complete search history.

(56) References Cited

U.S. PATENT DOCUMENTS

| | | | |
|---|---|---|---|
| 2018/0136912 A1* | 5/2018 | Venkataramani | G06N 3/048 |
| 2021/0174817 A1* | 6/2021 | Grauman | G10L 25/51 |
| 2022/0369031 A1* | 11/2022 | Lester | G10L 21/028 |

* cited by examiner

Primary Examiner — Quynh H Nguyen (57) ABSTRACT

A system includes memory storing instructions and a processing device coupled to the memory. The processing device executes the instructions to: receive a noisy audio signal from an audio receiver; pass the noisy audio signal through a deep neural network (DNN) model to generate a mask of a magnitude spectrogram of the noisy audio signal; retrieve a clean-only audio spectra and a noise-only spectra of one or more frequencies that exist within the noisy audio signal; generate a loss function as a combination of the clean-only audio spectra multiplied by the mask and the noise-only spectra multiplied by the mask; and train the DNN model while minimizing the loss function to generate a trained DNN model useable in audio noise suppression and dereverberation.

25 Claims, 9 Drawing Sheets

EMBEDDED ENABLEMENT FOR OPTIMAL GAIN-MASK MACHINE LEARNING, AUDIO CHANNEL-BASED SIGNAL ENHANCEMENT

BACKGROUND

Audio or speech enhancement components and/or processing are often employed in consumer electronics devices with voice control, voice communication, and identification in order to decrease the surrounding noise and audio distortions, increasing performance of wake word detection (WWD), automated speech recognition (ASR) algorithms, and voice communication related applications that rely on a level of audio detection quality. Typical methods involving voice activity detection (VAD) and power spectral density (PSD) estimation of speech and noise are insufficient due to numerous parameters involved with different voice characteristics (speed, pitch, tone, and the like), noise characteristics (static, dynamic, non-linear, additive, reverberation-related, and the like), and different trade-offs required for different applications. Thus, existing methods fail to efficiently and effectively extrapolate time-varying audio data, requiring expensive and slow expert fine-tuning in design and implementation of the audio components or processing.

BRIEF DESCRIPTION OF THE DRAWINGS

The disclosure is illustrated by way of example, and not of limitation, in the figures of the accompanying drawings.

DETAILED DESCRIPTION

As discussed above, spectral-based, state-of-the-art algorithms tend to either maximize audio quality or noise suppression, but fail to find an optimum balance between noise suppression and signal distortion. Such algorithms include Weiner filters and deep Learning methods attempting to predict noise suppression based on an established criterion during learning, e.g., training of a machine learning model such as a neural network (NN). These methods may also bring a limitation in hardware acceleration for real-time performance, causing slower training and deployment.

To address at least the above-noted deficiencies, embodiments described herein provide for systems and methods that can implement embedded enablement for gain-mask machine learning with optimal trade-off, audio channel-based signal enhancement according to various embodiments. For example, in some embodiments, a machine learning model such as a deep neural network (DNN) model is trained to output a mask of a magnitude spectrogram that is applied to the noisy audio signal. There are many different gain masks that can be used for this task such as Ideal Ration Mask (IRM), Ideal Binary Mask (IBM), Phase Sensitive Mask (PSM), and the like. According to some embodiments, a computing or processing device also retrieves data from a dataset including a clean-only audio spectra and a noise-only audio spectra of frequencies that exist within the noisy audio signal. Thus, the dataset may be understood to be a source of supervised data by which to train the DNN model to behave according to certain criteria or constraints.

In various embodiments, therefore, the processing device further generates a loss function as a combination of the clean-only audio spectra multiplied by the mask and the noise-only spectra multiplied by the mask. In these embodiments, the processing device also trains the DNN model while minimizing the loss function to generate a trained DNN model, which is useable in audio noise suppression and dereverberation, among other audio processing. This minimization of the loss function may be understood as audio processing that minimizes the audio noise, e.g., approximates a sufficient amount of the audio noise that can then be removed, and that maximizes the clean-only audio spectra, e.g., the actual audio or speech data captured by an audio receiver. In various embodiments, a scalar value (e.g., an aggressiveness parameter) is employed within the loss function to balance a tradeoff between removing the audio noise and distorting the desired audio spectra within the noisy audio signal.

Advantages of the present disclosure include but are not limited to making training the DNN model be non-causal due to the separation of the noise from the speech for generating the loss function and also being computation-friendly. In various embodiments, the advantages further include employing filters that are separable within the DNN and able to also train the model to optimize noise suppression and signal quality. These and other advantages will be discussed hereinafter, as would be apparent to those skilled in the art of audio speech enhancement.

The following description sets forth numerous specific details such as examples of specific systems, components, methods, and so forth, in order to provide a good understanding of various embodiments of the techniques described herein for implementing activity recognition with integrated uncertainty. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Figure 1:
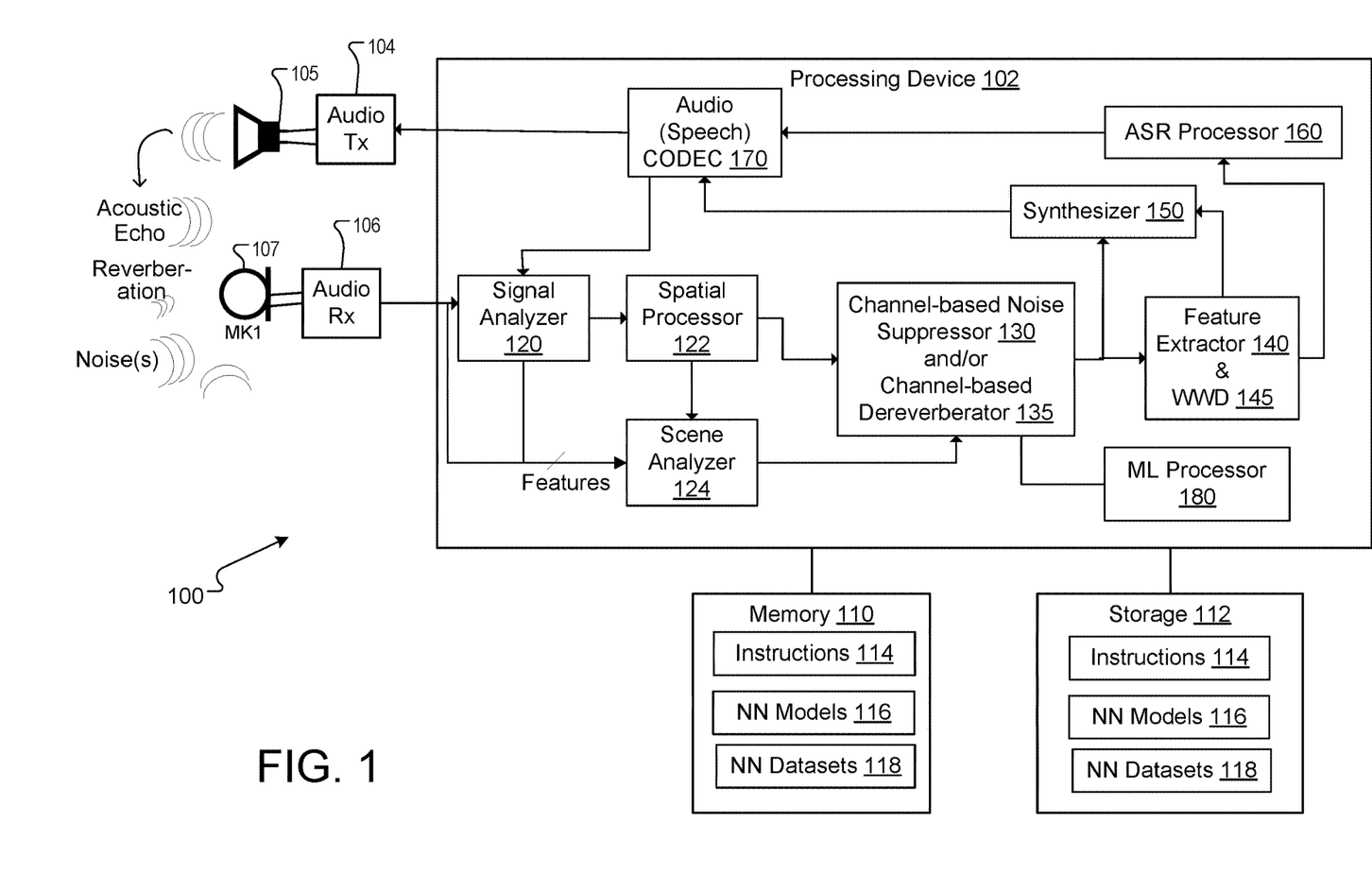
FIG. 1 is a block diagram of an example system for implementing embedded enablement for gain-mask machine learning, audio channel-based signal enhancement, according to some embodiments.

FIG. 1 is a block diagram of an example system 100 for implementing embedded enablement for gain-mask machine learning, audio channel-based signal enhancement, according to some embodiments. In various embodiments, the system 100 includes a processing device 102 (or other computing device or system) coupled to an audio transmitter 108, an audio receiver 106, a memory 110, and storage 112. In these embodiments, the audio transmitter 104 in turn drives a speaker 105 (or other audio output) and the audio receiver 106 is in turn coupled to a microphone 107 that received noisy audio signals. For example, the noisy audio signals may include audio (e.g., desired speech and/or other audio to be heard) mixed with acoustic echoes (e.g., from audio from the speaker 105 that bounces off a generally flat surface back to the microphone 107), reverberation of the audio (e.g., that bounces off of many surfaces at different angles), and noises that may be generated by other sound sources (e.g., other audio speakers, human speakers, background noise from machines, and the like). While the audio transmitter 108 and audio receiver 106 are illustrated outside of the processing device, in some embodiments, the audio transmitter 108 and audio receiver 106 are included at least partially within the processing device 102.

In at least some embodiments, the noisy sound signal is received at the audio receiver 106 through the microphone 107, and sent to the processing device 102 for analysis and processing. More specifically, in some embodiments, the processing device 102 includes a signal analyzer 120 coupled to a spatial processor 122, both which feed a scene analyzer 124, a channel-based noise suppressor 130 (and/or a channel-based dereverberator 135), a feature extractor 140, a wake word detector or WWD 145, a synthesizer 150, an ASR processor 160, and an audio coder/decoder or audio CODEC 170. In the present disclosure, the term "audio" should be understood to include speech in addition to music and other sounds. While the present embodiments are particularly applicable to speech, e.g., words to be detected, other contexts for audio processing such as music, concerts, and/or other noisy environments are also envisioned in order to sufficiently clean and clarify the noisy audio signal so it is discernable for listening.

In various embodiments, the noisy audio signal is analyzed by the signal analyzer 120 and processed by the spatial processor 122 to perform beamforming, detect direction of arrival, perform echo cancellation, spatial separation, and identify a specific channel and characteristics associated with the detected noisy audio signal. Various features, these characteristics, and other parameters may be sent to the scene analyzer 124 that can build an estimation of the environment, which may aid machine learning performed by or in associated with the channel-based noise suppressor 130 and/or dereverberator 135. This machine learning will be discussed in detail with reference to the remaining figures. Similarly, in some embodiments, noise and dereverberation may take input directly from the microphone 107 and/or the signal analyzer 120.

In these embodiments, once the noisy audio signal has been cleaned via noise and reverberation suppression, the feature extractor 140 may process the cleaned audio signal, e.g., to extract particular parameters and characteristics discussed earlier that may be used by the synthesizer 150 in accurately reassembling a full audio signal and by the local ASR processor 160 in automatically recognizing speech. Further, in these embodiments, the WWD 145 detects particular one or more words (e.g., a string of words) that functions to wake up (or trigger to full operation of) the system 100 or a larger computing device or system in which the system 100 operates. Outputs from the synthesizer 150 and the ASR processor 160 are provided to the audio CODEC 170 to be sent out of the audio transmitter 104.

In various embodiments, the channel-based noise suppressor 130 and/or dereverberator 135 includes or is coupled to a machine-learning (ML) processor 180. In at least some embodiments, the memory 110 and/or the storage 112 includes instructions 114, which are executable by the processing device 102 to perform the operations disclosed herein, NN models 116 (e.g., CNN-based, RNN-based, and the like), and NN datasets 118 such as supervised data that is gathered in relation to noisy audio signals used to train particular ML or NN models.

In at least some embodiments, the ML processor 180 retrieves algorithms from the NN models 116 (e.g., a DNN model) and data from the NN datasets 118, and trains the DNN model that then may be used during active operation to suppress noise, perform dereverberation, and output an enhanced clean audio signal for further processing by the processing device 102, as was just discussed. In some embodiments, the NN datasets 118 include clean-only audio spectra and noise-only audio spectra indexed in association with particular noisy audio signals or particular channels through to receive such noisy audio signals. In this way, the NN datasets 118 may be organized and accessed according to triplets for performing the disclosed training. Once trained, the DNN model (or other ML model) may be employed by the channel-based noise suppressor 130 and/or dereverberator 135 in active operation to output enhanced clean audio signals for further processing by the processing device 102.

Figure 2A:
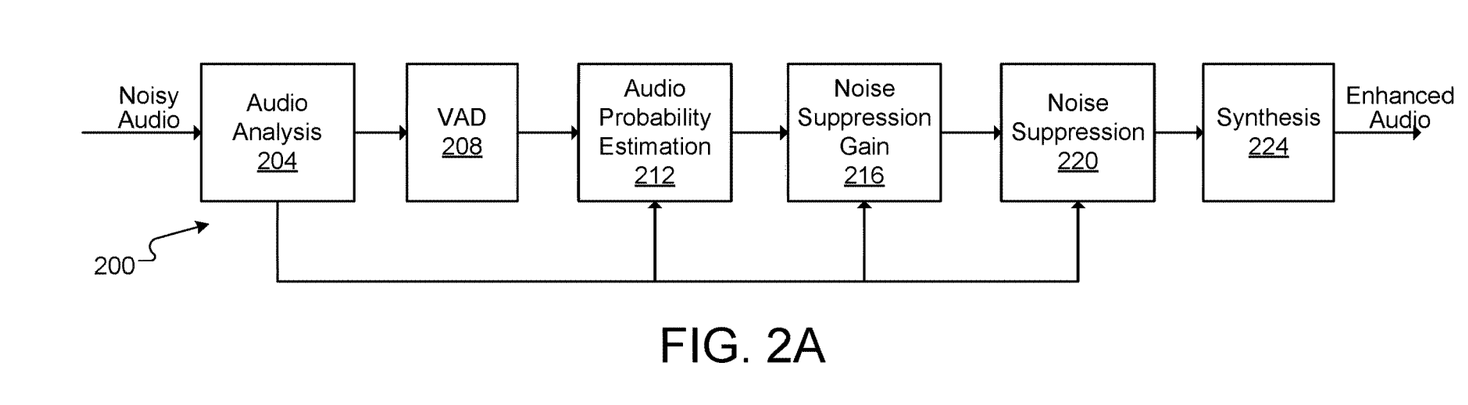
FIGS. 2A-2B are flow diagrams of example audio processing to generate enhanced audio and clean speech estimation, according to some embodiments.
Figure 2B:
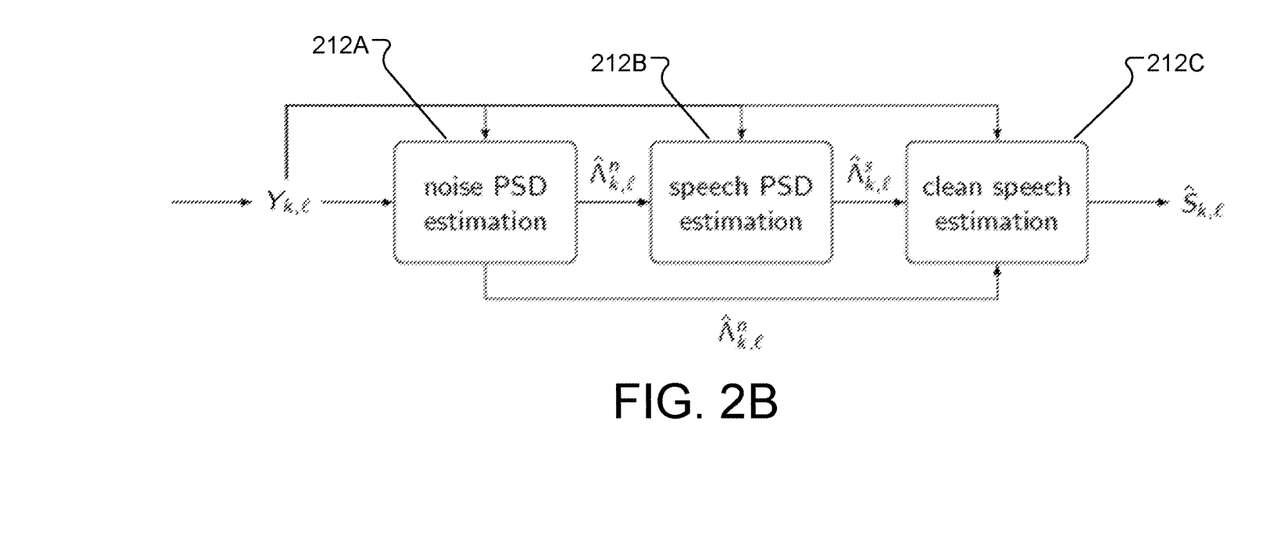

FIGS. 2A-2B are flow diagrams of example audio processing to generate enhanced audio and clean speech estimation, according to some embodiments. FIG. 2A, for example, illustrates an example method 200 for estimating audio power and noise and then suppresses the noise to clean a noisy audio signal. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the processing device 102 of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 204, the processing logic receives the noisy audio signal and performs audio analysis on the noisy audio signal. In one embodiment, this processing is performed by the signal analyzer 120 (FIG. 1). Although not specifically illustrated, the operation 204 may also include spatial processing that isolates a particular channel and determines characteristics and parameters of the channel that may be used during further audio processing.

At operation 208, the processing logic performs voice activity detection (VAD) on the analyzed audio signal. In one embodiment, this processing is performed by the signal analyzer 120 and/or the spatial processor 122 (FIG. 1).

At operation 212, the processing logic determine a-posteriori and a-priori signal-to-noise ratios (SNRs) and perform speech probability estimation of the audio signal passing through a particular audio channel. Part of the processing in operation 212 may rely on results of the audio analysis of operation 204. Further, the processing logic that performs this determination and estimation may include mathematical or algorithmic models, to include ML models, DNN models, and the like that estimate power spectral density (PSD) of both the noise and the desired audio (such as speech).

At operation 216, the processing logic performs noise suppression gain on the processed audio signal. At least part of the processing in operation 216 may rely on results of the audio analysis of operation 204.

At operation 220, the processing logic performs noise suppression on the processed audio signal. Part of the processing in operation 220 may rely on results of the audio analysis of operation 204.

At operation 224, the processing logic synthesizes the processed audio signal with additional information, including phase information, to generated an enhanced audio signal (e.g., to include enhanced speech).

FIG. 2B may be understood as a closer look, e.g., sub-operations of, operation 212 of FIG. 2A. For example, at suboperation 212A, the processing logic estimates the PSD of the audio noise in the noisy audio signal being processed by the method 200. At suboperation 212B, the processing logic estimates the PSD of the audio (e.g., speech) PSD. At suboperation 212C, the processing logic estimates the clean audio (or speech) based on removing the estimated noise PSD from the estimate audio PSD.

Figure 3:
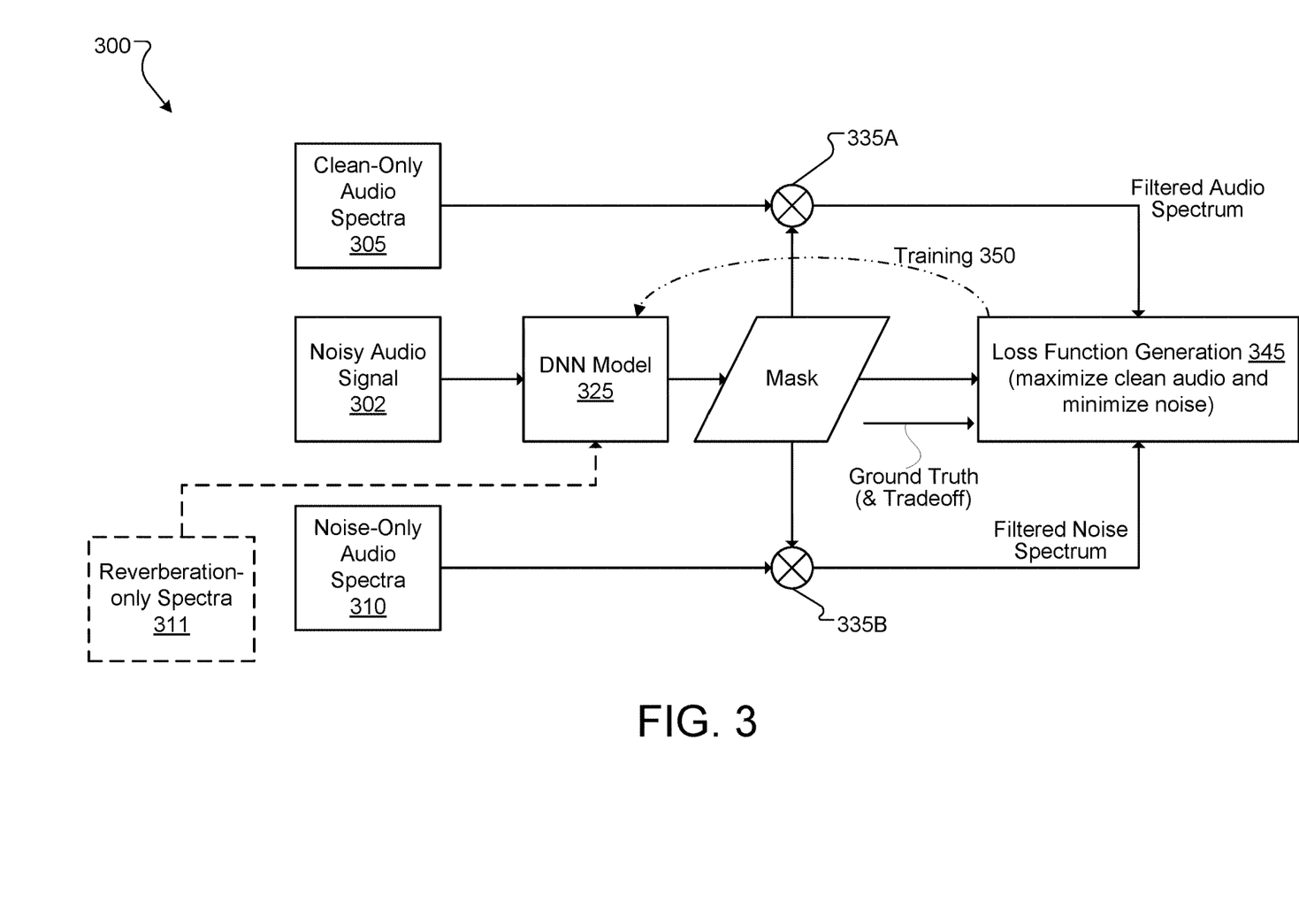
FIG. 3 is a flow diagram of an example method for training a deep neural network (DNN) model using a loss function generated based on noisy audio spectra, clean-only audio spectra, and noise-only audio spectra of a noisy audio signal, according to some embodiments.

FIG. 3 is a flow diagram of an example method 300 for training a deep neural network (DNN) model using a loss function generated based on clean-only audio spectra, noise-only audio spectra of a noisy audio signal or a combination of the clean and noise-only spectra, according to some embodiments. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the processing device 102 of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 302, the processing logic receives a noisy audio signal, e.g., from the audio receiver 106.

At operation 305, the processing logic retrieves clean-only audio spectra of the noisy audio signal, e.g., from the memory 110 or storage 112 (or perhaps even buffered in cache of the processing device 102). For example, for purposes of ML model training, the clean-only audio spectra may be generated a-priori and provided to the system 100 via the microphone 107 and audio receiver 106 for purposes of detecting a related noisy audio signal.

At operation 310, the processing logic retrieves noise-only audio spectra of the noisy audio signal, e.g., from the memory 110 or storage 112 (or perhaps even buffered in cache of the processing device 102). For example, for purposes of ML model training, the noise-only audio spectra may be generated by listening only for noise (e.g., no audio signal being received) via the microphone 107 and the audio receiver 106) and adding any known echo signature data associated with the audio signal (e.g., received from the audio CODEC 170). After the noise-only audio spectra is captured in advance of the ML model training, the noise-only audio spectra is stored for use during ML model training. This same methodology may be applied also to other distortions such as reverberation.

Figure 5:
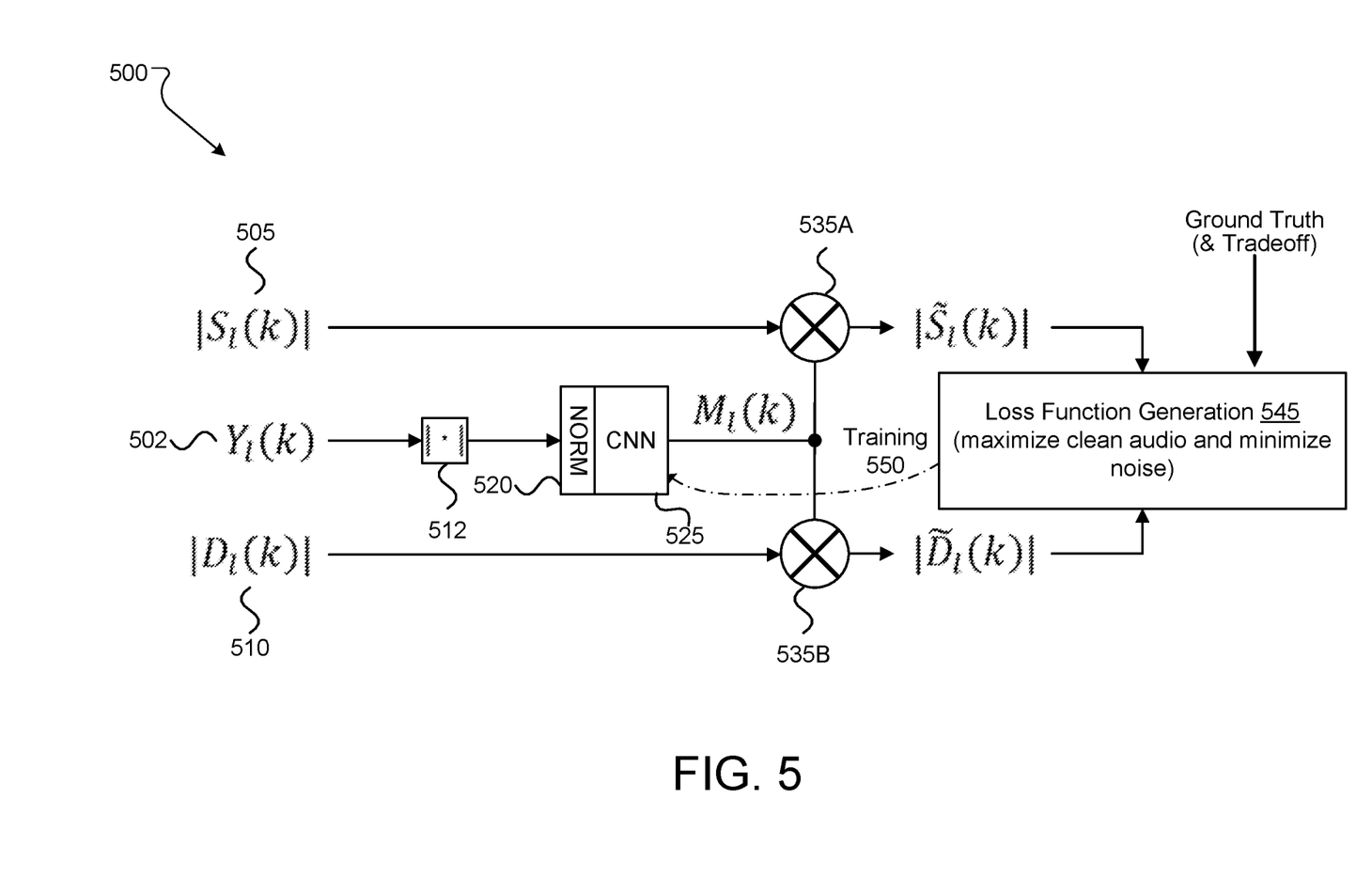
FIG. 5 is a flow diagram of an example training method of a Convolution Neural Network (CNN) model, according to at least additional embodiments.

At optional operation 311 (so indicated with dashed lines), the processing logic also retrieves a reverberation-only spectra signal, e.g., from the memory 110 or storage 112 (or perhaps even buffered in cache of the processing device 102). For example, for purposes of ML model training, the reverberation-only spectra signal may be obtained by filtering out known echo and noise components to focus only on reverberation-based signals. In at least some embodiments, the reverberation-only spectra signal is treated as a third isolated spectra for use in training the mask and DNN model. While not illustrated, this optional operation 311 may also be added to the training method 500 (FIG. 5). In other embodiments, the reverberation-based spectra is integrated within the noise-only audio spectra.

At operation 325, the processing logic executes the DNN model on the noisy audio signal to generate a mask. In some embodiments, during iterations of performing the training of the method 300, the mask may begin as an ideal mask, including only ones and zeros, determined a-priori based on at least the clean-only audio spectra.

At operation 335A, the processing logic multiplies the mask by the clean-only audio spectra to generate a filtered audio spectrum.

At operation 335B, the processing logic multiplies the mask by the noise-only audio spectra to generate a filtered noise spectrum. A similar operation may be employed to generate a filtered reverberation spectrum as well.

At operation 345, the processing logic generates a loss function as a combination of the filtered audio spectrum and the filtered noise spectrum. In some embodiments, the combination of operation is such that the noise is suppressed the most and the desired (or clean) audio is emphasized the most. As will be explained in more detail, the balance between minimizing the noise and maximizing the desired or clean audio may be performed using a scalar value, which may be tuned during the ML training in some embodiments. In some embodiments, the scalar value is between a zero value and a one value.

At operation 350, the processing logic incorporates the loss function generated in operation 345 into the DNN model, thereby training the DNN model so that future iterations of the method 300 generate an updated mask. For example, the processing logic can minimize the loss function in generating the parameters and weights for the DNN model (or other ML model) that balances minimization of the filtered noise spectrum with avoiding too much audio distortion of the clean audio signal. The trained DNN model (or ML model) may then be employed by the channel-based noise suppressor 130 and/or dereverberator 135 in audio noise suppression and dereverberation, respectively.

Figure 4:
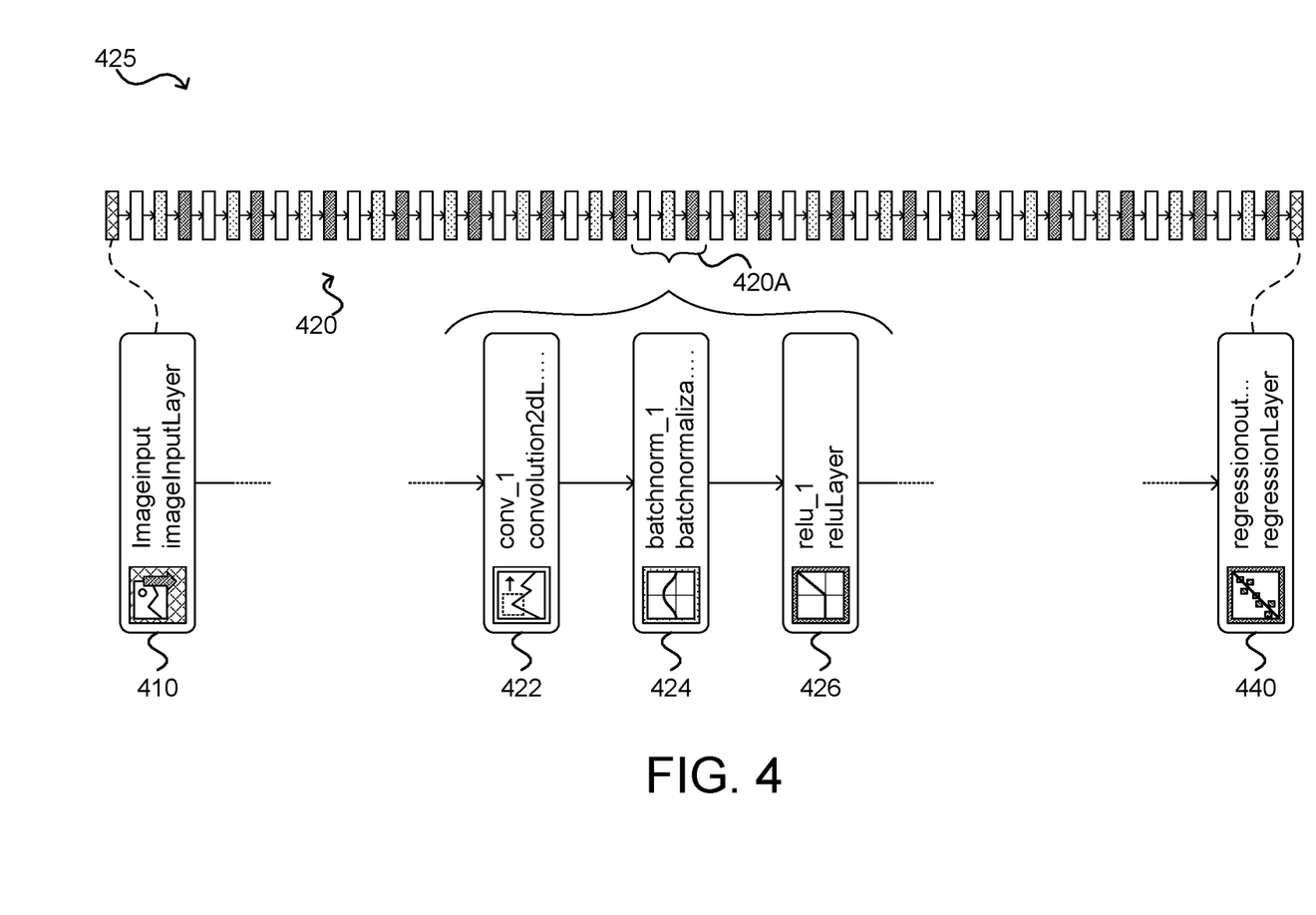
FIG. 4 is a diagrammatic depiction of an example DNN model that is trainable as described herein, according to at least some embodiments.

FIG. 4 is a diagrammatic depiction of an example DNN model 425 that is trainable as described herein, according to at least some embodiments. For example, in some embodiments, the DNN model 425 includes an initial, image input layer 410 to receive the noise audio signal spectrogram as initial inputs to the DNN model 425. The rest of the DNN model 425 is composed mostly of multiple sets of intermediate layers 420, where one set of intermediate layers 420A is specified by way of example. In these embodiments, the DNN model 425 further includes a final regression layer 440 (e.g., a sigmoid layer) to learn from outputs of the multiple sets of intermediate layers 420 and estimate values of the mask.

In some embodiments, the set of intermediate layers 420 includes a convolutional layer 422 followed by a batch normalization layer 424 followed by a rectified linear unit layer 426, e.g., a ReLU activation function. In some embodiments, the convolutional layer 422 performs template matching by optionally applying a convolutional filtering operation, which generates feature map values associated with the noisy audio signal. The batch normalization layer 424 may then normalize the feature map values so that these values are standardized for mutual comparison. In some embodiments, the rectified linear unit layer 426 is, or implements, a ReLU activation function that triggers a zero or plus one (0, 1) output based on the input-normalized feature map values. This ReLU activation function may introduce non-linearity into the DNN model 425, allowing the DNN model 425 to learn from the error and make adjustments, which is needed for learning complex patterns. The simplicity in both computation and gradient propagation makes the ReLU function a popular choice compared to sigmoid or tanh activation functions, especially for deeper networks. While the example DNN model 425 is illustrated as a convolutional NN (or CNN) type architecture, other architectures are envisioned by replacing the convolutional layers with different types of DNN layers.

FIG. 5 is a flow diagram of an example training method 500 of a CNN model, according to at least additional embodiments. The training method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the training method 500 is performed by the processing device 102 of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing logic receives a noisy audio signal $Y_f(k)$, e.g., from the audio receiver 106.

At operation 505, the processing logic retrieves clean-only audio spectra $|S_f(k)|$ of the noisy audio signal $Y_f(k)$, e.g., from the memory 110 or storage 112 (or perhaps even buffered in cache of the processing device 102). For example, for purposes of ML model training, the clean-only audio spectra $|S_f(k)|$ may generated a-priori and provided to the system 100 via the microphone 107 and audio receiver 106 for purposes of detecting a related noisy audio signal. After the noise-only audio spectra is captured in advance of the ML model training, the noise-only audio spectra is stored for use during ML model training.

At operation 510, the processing logic retrieves noise-only audio spectra $|D_f(k)|$ of the noisy audio signal $Y_f(k)$, e.g., from the memory 110 or storage 112 (or perhaps even buffered in cache of the processing device 102). For example, for purposes of ML model training, the noise-only audio spectra may be generated by listening only for noise (e.g., no audio signal being received) via the microphone 107 and the audio receiver 106) and adding any known echo signature data associated with the audio signal (e.g., received from the audio CODEC 170).

At operation 512, the processing logic determines an absolute magnitude of the noisy audio signal, or $|Y_f(k)|$, which can be a vector (or matrix) associated with a frequency in the noisy audio signal. The phase or frequency of the vector (or matrix) may be stored for later reference by the synthesizer 150, for example (see FIG. 8).

At operation 520, the processing logic normalizes the absolute magnitude of the noisy audio signal, e.g., of the vector of the matrix.

At operation 525, the processing logic executes the CNN model on the absolute value of the noisy audio signal $|Y_f(k)|$ to generate a mask $M_f(k)$, which is composed of real-valued, time-frequency data. In some embodiments, during iterations of performing the training method 500, the mask $M_f(k)$ may begin as an ideal ratio mask, including only ones and zeros, determined a-priori based on at least the clean-only audio spectra.

In some embodiments, during inferencing, first the mask is estimated and then the mask is multiplied with input noisy spectra to obtain the enhanced spectra. In some embodiments, the enhanced spectra is inverted back to the time-domain to get the enhanced synthesized speech. In some embodiments, the quality of a synthesized signal is evaluated using perceptual evaluation of speech quality (PESQ), signal-to-distortion ratio (SDR), and/or noise-to-signal ratio (NSR) criteria. During a listening test, a best representative from each test noise class may be obtained, which could be a number of distorted inputs that produced the best quality outputs, which can then be selected. Based on the listening tests as well as an objective test, a user may decide to change a tradeoff parameter for better speech enhancement outcome that is relevant for user applications (see FIG. 6).

At operation 535A, the processing logic multiplies the mask $M_l(k)$ by the clean-only audio spectra $|S_l(k)|$ to generate a filtered audio spectrum $|\widetilde{S}_l(k)|$.

At operation 535B, the processing logic multiplies the mask $M_l(k)$ by the noise-only audio spectra $|D_l(k)|$ to generate a filtered noise spectrum $|\widetilde{D}_l(k)|$. During the training method 500, the processing logic learns the mask $M_l(k)$ in a way that enhances the magnitude spectrogram of the noisy speech, e.g., as per Equation (1).

$$|\widetilde{S}_l(k)| = |Y_l(k)|.M_l(k), \text{ where } Y_l(k) = S_l(k) + D_l(k). \quad (1)$$

At operation 545, the processing logic generates a loss function as a combination of the filtered audio spectrum $|\widetilde{S}_l(k)|$ and the filtered noise spectrum $|\widetilde{D}_l(k)|$. In some embodiments, the combination of operations is such that the noise is suppressed the most (e.g., minimized loss of the filtered noise spectrum) and the desired (or clean) audio is emphasized the most (e.g., minimized in the loss function). In one example embodiment, the loss function is expressed as per Equation (2).

$$J_\ell^{2CL} = (1-\alpha) \cdot \sum_{k \in \mathcal{K}} \left(|\widetilde{S}_\ell(k)| - |S_\ell(k)|\right)^2 + \alpha \cdot \sum_{k \in \mathcal{K}} \left(|\widetilde{D}_\ell(k)|\right)^2 \quad (2)$$

As can be observed, the balance between minimizing the noise and maximizing the desired or clean audio may be achieved using a scalar value ($\alpha$), which may be tuned during some embodiments of the training method 300 such as to minimize the filtered noise spectrum and minimize distortion of the filtered audio spectrum. For example, the scalar value ($\alpha$) is multiplied by the accumulation of a square of the filtered noise spectrum $|\widetilde{D}_\ell(k)|$ to maximize suppression of the noise. Similarly, one minus the scalar value ($1-\alpha$) is multiplied by the accumulation of a square of the difference between the filtered audio spectrum $|\widetilde{S}_\ell(k)|$ and the clean-only audio spectra $|S_l(k)|$ to minimize loss of the magnitude spectrogram of the noisy speech.

At operation 550, the processing logic incorporates the loss function generated in operation 545 into the DNN model, thereby training the DNN model so that future iterations of the method 500 generate an updated or enhanced mask. For example, the processing logic can minimize the loss function in generating the parameters and weights for the DNN model (or other ML model) that balances minimization of the filtered noise spectrum with avoiding too much audio distortion of the clean audio signal. The trained DNN model (or ML model) may then be employed by the channel-based noise suppressor 130 and/or dereverberator 135 in audio noise suppression and dereverberation, respectively.

In some embodiments, the processing logic can modify the loss function such as expressed Equation (2) in one or more ways for enhanced ML training or performance of the training method 500. For example, in some embodiments, the processing logic determines an ideal ratio mask (IRM) as the square of the clean-only audio spectra $S(t,f)^2$ divided by a combination of the square of the clean-only audio spectra and that of the noise-only spectra $N(t,f)^2$, e.g., which can be expressed as Equation (3).

$$IRM(t,f) = \sqrt{\frac{S(t,f)^2}{S(t,f)^2 + N(t,f)^2}}. \quad (3)$$

In these embodiments, this ideal ratio mask (IRM) may be defined in the magnitude domain of the noisy audio signal. Specifically, a predicted mask ($L_{mask}$) may be based on the energy of speech and noise in time-frequency (TF) units, as expressed in Equation (4), where RM denotes the predicted ratio mask.

$$L_{mask} = \frac{1}{TF} \sum_{t,f} |RM(t,f) - IRM(t,f)| \quad (4)$$

Thus, in some embodiments of operation 545, the processing logic also determines an ideal ratio mask as the clean-only audio spectra divided by a combination of the clean-only audio spectra and the noise-only spectra, e.g., something similar to Equation (3). Further, the processing logic determines a time-frequency-based loss function as an absolute magnitude of a difference of a predicted ratio mask and the ideal ratio mask over time and the one or more frequencies, e.g., something similar to Equation (4). Finally, the processing logic modifies the loss function of Equation (2), with the addition of loss function of Equation (2) and time-frequency-based loss function of Equation (4). In varying embodiments, this modification may be an addition to or integration of the time-frequency-based loss function.

Figure 6:
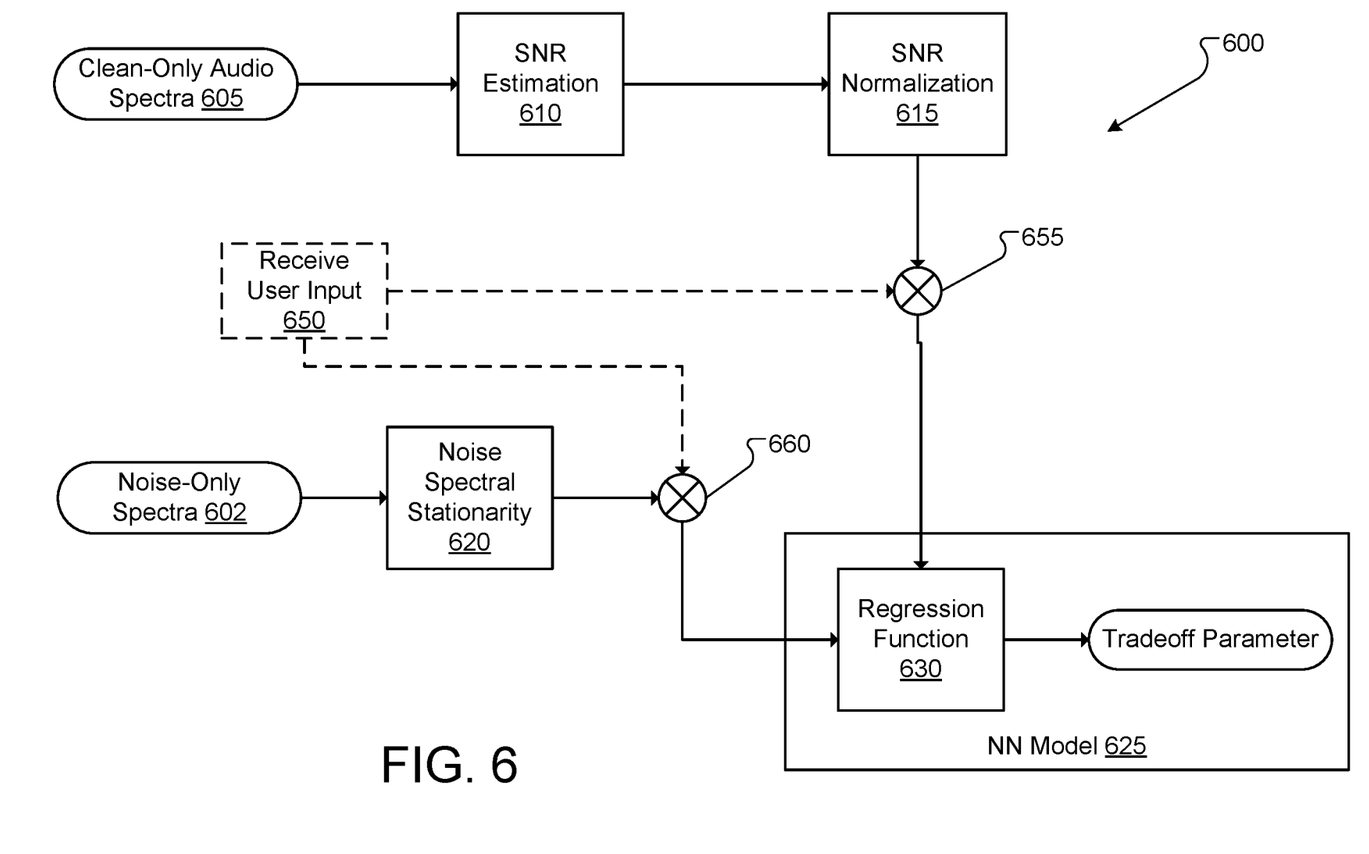
FIG. 6 is a flow diagram of a method for estimating a tradeoff parameter that tunes an emphasis between the clean-only spectra and the noise-only spectrum according to some embodiments.

FIG. 6 is a flow diagram of a method 600 for estimating a tradeoff parameter that tunes an emphasis between the clean-only spectra and the noise-only spectra according to some embodiments. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the processing device 102 of FIG. 1.

In some embodiments, method 600 is understood as an addition to the operation 525 of FIG. 5 in which the CNN model is trained by generating the mask, as discussed herein, but here further by way of tuning the tradeoff between emphasis of a clean-only audio spectra 605 and the noise-only spectra 602. In some embodiments, the clean-only audio spectra 605 is retrieved at operation 505 and the noise-only spectra 602 is retrieved at operation 502 of FIG. 5.

In at least some embodiments, the tradeoff is of between removing the audio noise and distorting the desired audio spectra within the noisy audio signal in a way that best enhances an audio signal with acceptable (e.g., minimized) levels of audio distortion. In terms of audio processing, in some embodiments, the tradeoff of the method 600 balances signal-to-noise ratio (SNR) and a noise spectral stationarity measure that may be between [0, 1]. A stationarity measure may refer to measuring a feature or parameter that does not vary over time, where here the noise spectral stationarity measure represents spectral flatness of noise samples in the noise-only spectra 602. The benefit of monitoring noise in training is that this information is not available during performing inference using the trained machine learning (or NN) model. For example, higher weighting is applied for noise-only loss components where SNR is lower and spectral stationarity is higher since training the machine learning model (e.g., a NN model 625) may struggle with this balance of spectra weighting.

In illustrated embodiments, at operation 610, the processing logic estimates SNR of the clean-only spectra, and at operation 615, the processing logic normalizes the estimated SNR value to generate normalized estimated SNR values of the clean-only audio spectra 605.

In some embodiments, at operation 620, the processing logic measures noise spectral stationarity of the noise-only spectra 602 to generate a measured noise spectral stationarity values that characterize the flatness of the noise-only spectra 602.

In some embodiments, at operation 630, a regression function maps the normalized estimated SNR values and the measured noise spectral stationarity values. The regression function tradeoff parameter output, in some embodiments, is integrated as a training (or adaptation) function or layer of the NN model 625. In some embodiments, the tradeoff parameter output is integrated with generation of the loss function at operation 345, e.g., as a part of or in addition to ground truth used to supervise train the DNN model at operation 350 (see FIG. 3). In some embodiments, the tradeoff parameter output is integrated with generation of the loss function at operation 545, e.g., as part of or in addition to ground truth used to supervise train the CNN model at operation 550 (see FIG. 5).

In at least some optional embodiments, at operation 650, the processing logic receives a user input that pre-weights the normalized estimated SNR values differently from the measured noise spectral stationarity values. For example, at operation 655, the processing logic multiplies a first weight from the user input by the normalized estimated SNR values before being passed to the regression function. Further, at operation 660, the processing logic multiplies a second weight from the user input by the measured noise spectral stationarity values before being passed to the regression function at operation 630. In at least some embodiments, the first weight is different from the second weight depending on a tradeoff level between SNR estimation and noise spectral stationarity removal that is desired. In this way, a user or operator may provide a real-time tradeoff tuning of the NN model training based on these input weightings.

Thus, by way of example, the processing logic may perform a signal-to-noise ratio (SNR) estimation and normalization on the clean-only audio spectra to generate normalized estimated SNR values. The processing logic may further measure noise spectral stationarity of the noise-only spectra to generate a measured noise spectral stationarity that characterizes the flatness of the noise-only spectra. The processing logic may further incorporate weighted versions of the normalized estimated SNR values and the measured noise spectral stationarity in a regression function that generates a tradeoff parameter useable in training the DNN model, e.g., at operation 525 of FIG. 5. The processing logic may further be incorporated to include unsupervised methods on SNR and spectral stationarity methods to choose trade-off at different scale.

Figure 7:
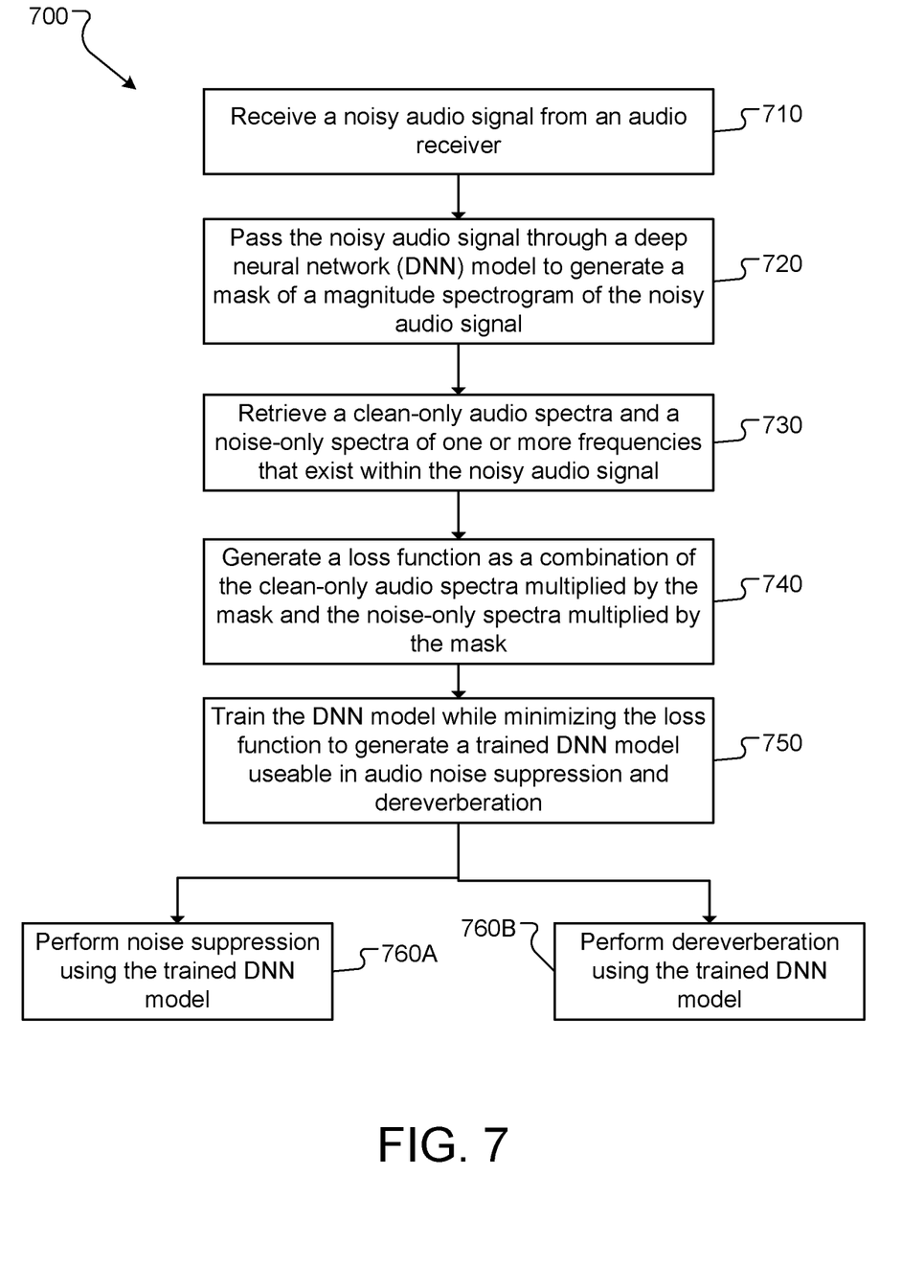
FIG. 7 is a flow diagram of an example method of training a DNN model using a loss function generated based on clean-only audio spectra and noise-only audio spectra of a noisy audio signal, according to some embodiments.

FIG. 7 is a flow diagram of an example method 700 of training a DNN model using a loss function generated based on clean-only audio spectra and noise-only audio spectra of a noisy audio signal, according to some embodiments. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the processing device 102 of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, the processing logic receives a noisy audio signal from an audio receiver.

At operation 720, the processing logic passes the noisy audio signal through a deep neural network (DNN) model to generate a mask of a magnitude spectrogram of the noisy audio signal.

At operation 730, the processing logic retrieves a clean-only audio spectra and a noise-only spectra of one or more frequencies that exist within the noisy audio signal.

At operation 740, the processing logic generates a loss function as a combination of the clean-only audio spectra multiplied by the mask and the noise-only spectra multiplied by the mask.

At operation 750, the processing logic trains the DNN model while minimizing the loss function to generate a trained DNN model useable in audio noise suppression and dereverberation.

At operation 760A, the processing logic performs noise suppression using the trained DNN model.

At operation 760B, the processing logic performs dereverberation using the trained DNN model.

Figure 8:
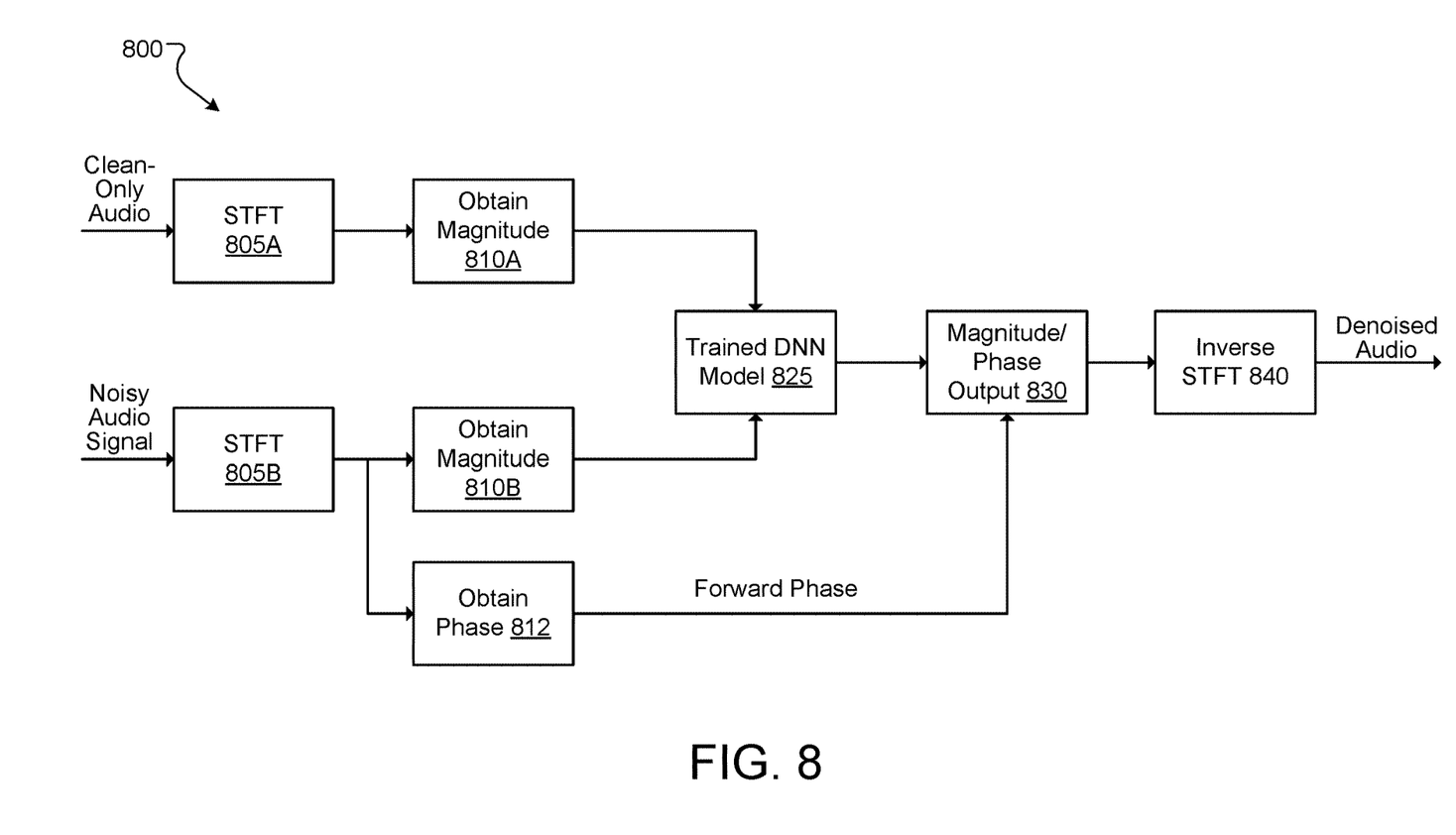
FIG. 8 is a flow diagram of a method for generating a denoised audio signal from a noisy audio signal using a trained DNN model, according to some embodiments.

FIG. 8 is a flow diagram of a method 800 for generating a denoised audio signal from a noisy audio signal using a trained DNN model, according to some embodiments. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the processing device 102 of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In some embodiments, the processing logic performs, using the trained DNN model, at least one of channel-based noise suppression or channel-based dereverberation during active operation. In some embodiments, the DNN model not only determines an ideal ratio mask (e.g., the mask referred to previously), but also can be used to determine desired constraints to be applied in finding a trade-off between noise suppression and speech distortion, which was discussed as well.

At operation 805A, the processing logic processes the clean-only audio spectra with a Short-Term Fourier Transform (STFT) function.

At operation 810A, the processing logic determines a first magnitude (e.g., absolute magnitude) of the processed clean-only audio spectra. While STFT is explicitly illustrated for operations 805A and 810A, the method 300 may instead employ Mel Frequency Cepstral Coefficients (MFCCs) processing to yield a compressed representation of the spectral shape.

At operation 805B, the processing logic processes the noisy audio signal with the STFT function.

At operation 810B, the processing logic determines a second magnitude.

At operation 812, the processing logic determines a first phase of the processed noisy audio signal, which is forwarded to operation 830.

At operation 825, the processing logic inputs, to the trained DNN model, the first magnitude as a target audio signal and the second magnitude as a predicted audio signal. The trained DNN model executes on the combination of the first magnitude and the second magnitude, e.g., which can be two separate input vectors in an embodiment.

At operation 830, the processing logic employs an output of the trained DNN model as an output magnitude and the phase as an output phase to generate an output audio signal.

At operation 840, the processing logic applies an inverse STFT function (or an analogous inverse MFCC function) to the output audio signal to generate a denoised audio signal and/or a dereverberated audio signal.

Figure 9:
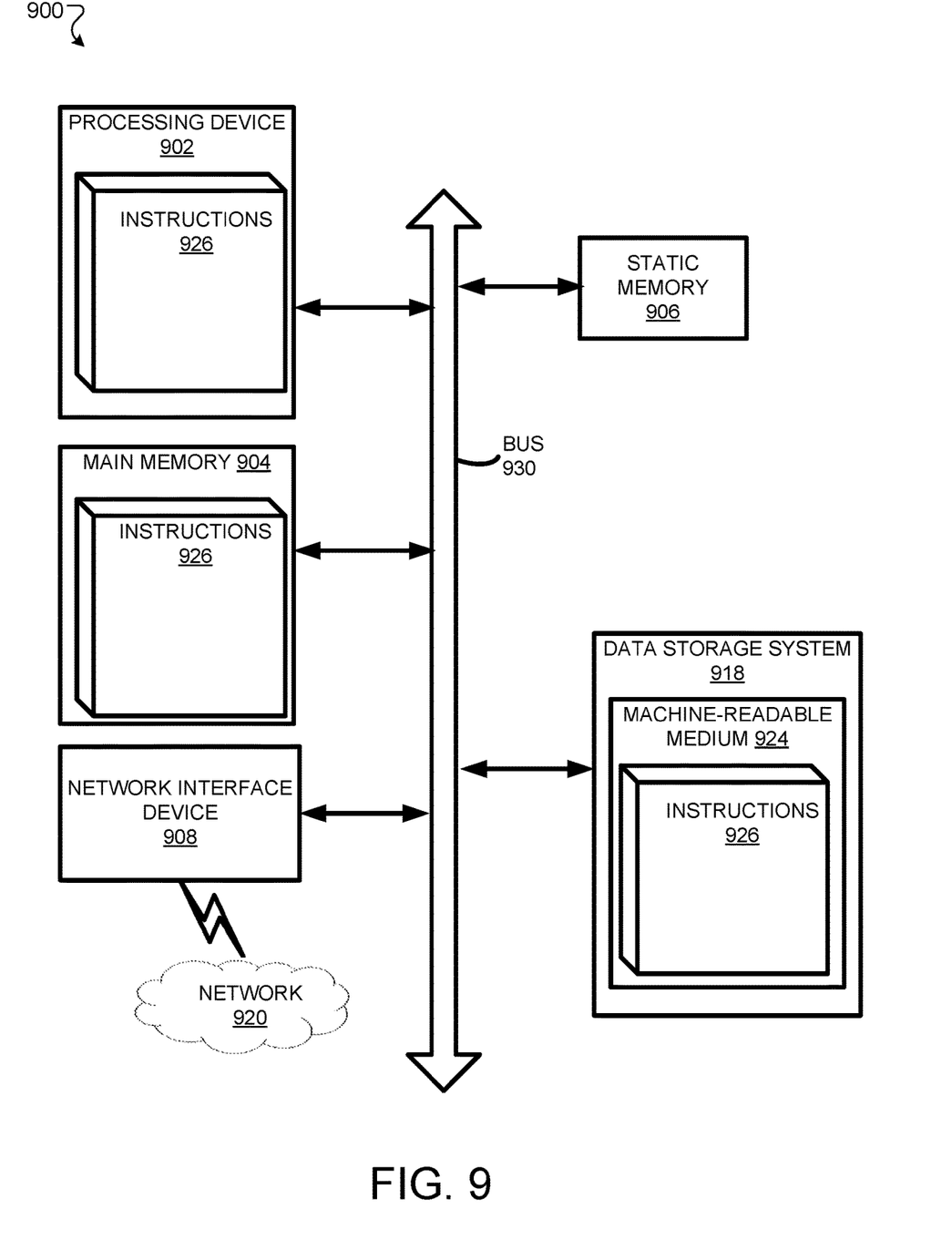
FIG. 9 is a block diagram of an example computer system in which embodiments of the present disclosure can operate.

FIG. 9 illustrates an example machine of a computer system 900 within which a set of instructions, for causing the machine to perform any one or more of the methodologies discussed herein, can be executed. In some embodiments, the computer system 900 can correspond to a computing device that can be used to perform the operations of enablement for gain-mask machine learning, audio channel-based signal enhancement (e.g., the system 100 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable storage medium or non-transitory computer-readable storage medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the system 100 of FIG. 1.

In one embodiment, the instructions 926 include instructions to implement functionality corresponding to the system 100 of FIG. 1. While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "allocating," "dynamically allocating," "redistributing," "ignoring," "reallocating," "detecting," "performing," "polling," "registering," "monitoring," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:
   memory storing instructions; and
   a processing device coupled to the memory, the processing device to execute the instructions to:
     receive a noisy audio signal from an audio receiver;
     pass the noisy audio signal through a deep neural network (DNN) model to generate a mask of a magnitude spectrogram of the noisy audio signal;
     retrieve a clean-only audio spectra and a noise-only spectra of one or more frequencies that exist within the noisy audio signal;
     generate a loss function as a combination of the clean-only audio spectra multiplied by the mask, which comprises a filtered audio spectrum, and the noise-only spectra multiplied by the mask, which comprises a filtered noise spectrum, and wherein the loss function comprises:
       a scalar value multiplied by the filtered noise spectrum; and
       one minus the scalar value multiplied by a difference between the filtered audio spectrum and the clean-only audio spectra; and
     train the DNN model while minimizing the loss function to generate a trained DNN model useable in audio noise suppression and dereverberation.

2. The system of claim 1, wherein the processing device is further to:
   perform a signal-to-noise ratio (SNR) estimation and normalization on the clean-only audio spectra to generate normalized estimated SNR values;
   measure noise spectral stationarity of the noise-only spectra to generate a measured noise spectral stationarity values that characterize the flatness of the noise-only spectra; and
   incorporate weighted versions of the normalized estimated SNR values and the measured noise spectral stationarity values in a regression function that generates a tradeoff parameter output useable in training the DNN model.

3. The system of claim 1, wherein the processing device is further to perform, using the trained DNN model, at least one of channel-based noise suppression or channel-based dereverberation during active operation.

4. The system of claim 3, wherein the processing device is further to:
   process the clean-only audio spectra with a Short-Term Fourier Transform (STFT) function and determine a first magnitude of the processed clean-only audio spectra;
   process the noisy audio signal with the STFT function;
   determine a second magnitude and a first phase of the processed noisy audio signal;
   input, to the trained DNN model, the first magnitude as a target audio signal and the second magnitude as a predicted audio signal;
   employ an output of the trained DNN model as an output magnitude and the phase as an output phase to generate an output audio signal; and apply an inverse STFT function to the output audio signal to generate a denoised audio signal.

5. The system of claim 1, wherein the mask is an ideal ratio mask, comprising only ones and zeros, determined a-priori based on at least the clean-only audio spectra.

6. The system of claim 1, wherein the DNN model comprises:
 multiple sets of intermediate layers, each set including a convolutional layer followed by a batch normalization layer followed by a sigmoid layer; and
 a final regression layer to learn from outputs of the multiple sets of intermediate layers and estimate values of the mask.

7. The system of claim 1, wherein the scalar value is an aggressiveness parameter that is tunable to balance a tradeoff between removing the noise-only spectra and distorting the filtered audio spectrum.

8. The system of claim 1, wherein the scalar value is between a zero value and a one value, and wherein the processing device is further to tune the scalar value such as to minimize both the filtered noise spectrum and distortion of the filtered audio spectrum.

9. The system of claim 1, wherein the processing device is further to:
 determine an ideal ratio mask as the clean-only audio spectra divided by a combination of the clean-only audio spectra and the noise-only spectra;
 determine a time-frequency-based loss function as an absolute magnitude of a difference of a predicted ratio mask and the ideal ratio mask over time and the one or more frequencies; and
 modify the loss function with the time-frequency-based loss function.

10. A computer-implemented method, performed by a processing device, comprising:
 receiving a noisy audio signal from an audio receiver;
 passing the noisy audio signal through a deep neural network (DNN) model to generate a mask of a magnitude spectrogram of the noisy audio signal;
 retrieving a clean-only audio spectra and a noise-only spectra of one or more frequencies that exist within the noisy audio signal;
 generating a loss function as a combination of the clean-only audio spectra multiplied by the mask, which comprises a filtered audio spectrum, and the noise-only spectra multiplied by the mask, which comprises a filtered noise spectrum, and wherein the loss function comprises:
  a scalar value multiplied by the filtered noise spectrum; and
  one minus the scalar value multiplied by a difference between the filtered audio spectrum and the clean-only audio spectra; and
 training the DNN model while minimizing the loss function to generate a trained DNN model useable in audio noise suppression and dereverberation.

11. The computer-implemented method of claim 10, further comprising:
 perform a signal-to-noise ratio (SNR) estimation and normalization on the clean-only audio spectra to generate normalized estimated SNR values;
 measure noise spectral stationarity of the noise-only spectra to generate a measured noise spectral stationarity values that characterize the flatness of the noise-only spectra; and
 incorporate weighted versions of the normalized estimated SNR values and the measured noise spectral stationarity values in a regression function that generates a tradeoff parameter output useable in training the DNN model.

12. The computer-implemented method of claim 10, further comprising performing, using the trained DNN model, at least one of channel-based noise suppression or channel-based dereverberation during active operation.

13. The computer-implemented method of claim 12, further comprising:
 processing the clean-only audio spectra with a Short-Term Fourier Transform (STFT) function and determine a first magnitude of the processed clean-only audio spectra;
 processing the noisy audio signal with the STFT function;
 determine a second magnitude and a first phase of the processed noisy audio signal;
 inputting, to the trained DNN model, the first magnitude as a target audio signal and the second magnitude as a predicted audio signal;
 employing an output of the trained DNN model as an output magnitude and the phase as an output phase to generate an output audio signal; and
 applying an inverse STFT function to the output audio signal to generate a denoised audio signal.

14. The computer-implemented method of claim 10, wherein the mask is an ideal mask, comprising only ones and zeros, determined a-priori based on at least the clean-only audio spectra.

15. The computer-implemented method of claim 10, wherein the DNN model comprises:
 multiple sets of intermediate layers, each set including a convolutional layer followed by a batch normalization layer followed by a sigmoid layer; and
 a final regression layer to learn from outputs of the multiple sets of intermediate layers and estimate values of the mask.

16. The computer-implemented method of claim 10, further comprising tuning the scalar value as an aggressiveness parameter to balance a tradeoff between removing the noise-only spectra and distorting the filtered audio spectrum.

17. The computer-implemented method of claim 10, wherein the scalar value is between a zero value and a one value, the method further comprising tuning the scalar value such as to minimize both the filtered noise spectrum and distortion of the filtered audio spectrum.

18. The computer-implemented method of claim 10, further comprising:
 determining an ideal ratio mask as the clean-only audio spectra divided by a combination of the clean-only audio spectra and the noise-only spectra;
 determining a time-frequency-based loss function as an absolute magnitude of a difference of a predicted ratio mask and the ideal ratio mask over time and the one or more frequencies; and
 modifying the loss function with the time-frequency-based loss function.

19. A non-transitory computer-readable storage medium storing instructions, which when executed, cause a processing device to perform operations comprising:
 receiving a noisy audio signal from an audio receiver;
 passing the noisy audio signal through a deep neural network (DNN) model to generate a mask of a magnitude spectrogram of the noisy audio signal;
 retrieving a clean-only audio spectra and a noise-only spectra of one or more frequencies that exist within the noisy audio signal;

generating a loss function as a combination of the clean-only audio spectra multiplied by the mask, which comprises a filtered audio spectrum, and the noise-only spectra multiplied by the mask, which comprises a filtered noise spectrum, and wherein the loss function comprises:
- a scalar value multiplied by the filtered noise spectrum; and one minus the scalar value multiplied by a difference between the filtered audio spectrum and the clean-only audio spectra; and training the DNN model while minimizing the loss function to generate a trained DNN model useable in audio noise suppression and dereverberation.

20. The non-transitory computer-readable storage medium of claim 19, wherein the operations further comprise:
- perform a signal-to-noise ratio (SNR) estimation and normalization on the clean-only audio spectra to generate normalized estimated SNR values;
- measure noise spectral stationarity of the noise-only spectra to generate a measured noise spectral stationarity values that characterize the flatness of the noise-only spectra; and
- incorporate weighted versions of the normalized estimated SNR values and the measured noise spectral stationarity values in a regression function that generates a tradeoff parameter output useable in training the DNN model.

21. The non-transitory computer-readable storage medium of claim 19, wherein the operations further comprise performing, using the trained DNN model, at least one of channel-based noise suppression or channel-based dereverberation during active operation.

22. The non-transitory computer-readable storage medium of claim 21, wherein the operations further comprise:
- processing the clean-only audio spectra with a Short-Term Fourier Transform (STFT) function and determine a first magnitude of the processed clean-only audio spectra;
- processing the noisy audio signal with the STFT function;
- determine a second magnitude and a first phase of the processed noisy audio signal;
- inputting, to the trained DNN model, the first magnitude as a target audio signal and the second magnitude as a predicted audio signal;
- employing an output of the trained DNN model as an output magnitude and the phase as an output phase to generate an output audio signal; and
- applying an inverse STFT function to the output audio signal to generate a denoised audio signal.

23. The non-transitory computer-readable storage medium of claim 19, wherein the operations further comprise tuning the scalar value as an aggressiveness parameter to balance a tradeoff between removing the noise-only spectra and distorting the filtered audio spectrum.

24. The non-transitory computer-readable storage medium of claim 19, wherein the scalar value is between a zero value and a one value, wherein the operations further comprise tuning the scalar value such as to minimize both the filtered noise spectrum and distortion of the filtered audio spectrum.

25. The non-transitory computer-readable storage medium of claim 19, wherein the operations further comprise:
- determining an ideal ratio mask as the clean-only audio spectra divided by a combination of the clean-only audio spectra and the noise-only spectra;
- determining a time-frequency-based loss function as an absolute magnitude of a difference of a predicted ratio mask and the ideal ratio mask over time and the one or more frequencies; and
- modifying the loss function with the time-frequency-based loss function.

* * * * *